United States Patent
Chung et al.

(10) Patent No.: US 11,841,424 B2
(45) Date of Patent: Dec. 12, 2023

(54) METHODS AND ELECTRONIC DEVICE FOR DYNAMIC DISTANCE MEASUREMENTS

(71) Applicant: Texas Instruments Incorporated, Dallas, TX (US)

(72) Inventors: Peter Wongeun Chung, Frisco, TX (US); Leonardo William Estevez, Rockwall, TX (US); Johann Zipperer, Unterschleissheim (DE)

(73) Assignee: TEXAS INSTRUMENTS INCORPORATED, Dallas, TX (US)

( * ) Notice: Subject to any disclaimer, the term of this patent is extended or adjusted under 35 U.S.C. 154(b) by 378 days.

(21) Appl. No.: 15/823,935

(22) Filed: Nov. 28, 2017

(65) Prior Publication Data
US 2019/0162846 A1    May 30, 2019

(51) Int. Cl.
| | | |
|---|---|---|
| G01S 15/10 | (2006.01) | |
| G01S 7/526 | (2006.01) | |
| G01S 7/533 | (2006.01) | |

(52) U.S. Cl.
CPC .............. *G01S 15/10* (2013.01); *G01S 7/526* (2013.01); *G01S 7/533* (2013.01); *G01S 15/108* (2013.01)

(58) Field of Classification Search
None
See application file for complete search history.

(56) References Cited

U.S. PATENT DOCUMENTS

| | | | | |
|---|---|---|---|---|
| 4,596,144 A * | 6/1986 | Panton | ................. | G01F 23/2962 |
| | | | | 73/290 V |
| 5,764,541 A * | 6/1998 | Hermann | ................. | G01G 5/06 |
| | | | | 341/167 |
| 6,140,949 A * | 10/2000 | Tsay | .................... | H03M 1/1057 |
| | | | | 341/118 |
| 6,150,968 A * | 11/2000 | Tsay | .................... | H03M 1/1061 |
| | | | | 341/139 |
| 6,288,664 B1 * | 9/2001 | Swanson | ............... | H03M 1/185 |
| | | | | 341/139 |

(Continued)

FOREIGN PATENT DOCUMENTS

WO    WO-9531130 A1 *  11/1995 ........... G01S 15/894

OTHER PUBLICATIONS

Linear Technology, 2012, LTC2159 16-Bit, 20Msps Low Power ADC. (Year: 2012).*

*Primary Examiner* — Isam A Alsomiri
*Assistant Examiner* — Jonathan D Armstrong
(74) *Attorney, Agent, or Firm* — Brian D. Graham; Frank D. Cimino

(57) ABSTRACT

An electronic device and methods for providing high resolution ranging measurements are disclosed. The electronic device includes a pulse generator, a memory, an ADC, a timer, a comparator, a processing unit, connectors for coupling to a transceiver and instructions stored in the memory. The instructions, when performed by the processing unit, performs a method that determines an estimated time of arrival of a series of measurement pulses in the signal and turns on, prior to the estimated time of arrival, the ADC to capture the series of measurement pulses using a first resolution provided by sampling the signal at a rate equal to or greater than the Nyquist rate. The ADC remains on for a fixed time period sized to capture the series of measurement pulses.

20 Claims, 11 Drawing Sheets

(56) References Cited

U.S. PATENT DOCUMENTS

| | | | | |
|---|---|---|---|---|
| 6,310,518 B1* | 10/2001 | Swanson | H03M 1/185 | 330/282 |
| 6,414,619 B1* | 7/2002 | Swanson | H03M 1/185 | 341/139 |
| 6,590,517 B1* | 7/2003 | Swanson | H03M 1/185 | 341/139 |
| 7,812,504 B1* | 10/2010 | Trandafir | H01L 41/042 | 310/317 |
| 9,608,676 B2* | 3/2017 | Chen | H03F 3/245 | |
| 10,948,333 B2* | 3/2021 | Welle | G01F 23/284 | |
| 2001/0035841 A1* | 11/2001 | Porcino | G01S 5/14 | 342/387 |
| 2003/0146789 A1* | 8/2003 | Mitteregger | H03F 3/45206 | 330/260 |
| 2004/0151345 A1* | 8/2004 | Morcom | G01S 17/931 | 382/104 |
| 2008/0252507 A1* | 10/2008 | Gerfers | H03M 1/52 | 341/155 |
| 2009/0184857 A1* | 7/2009 | Furuta | H03M 1/1215 | 341/156 |
| 2011/0096184 A1* | 4/2011 | Shioya | H04N 1/648 | 348/222.1 |
| 2011/0148683 A1* | 6/2011 | Bremner | H03M 1/002 | 341/158 |
| 2012/0143357 A1* | 6/2012 | Chemel | H05B 47/105 | 700/90 |
| 2012/0257897 A1* | 10/2012 | Hu | H04L 27/2697 | 398/76 |
| 2013/0027232 A1* | 1/2013 | Liu | H03M 1/145 | 341/110 |
| 2013/0342681 A1* | 12/2013 | Duong | G06K 9/4619 | 348/135 |
| 2014/0035767 A1* | 2/2014 | Lin | H03M 1/38 | 341/110 |
| 2015/0031999 A1* | 1/2015 | Willsie | A61B 8/56 | 600/437 |
| 2015/0112220 A1* | 4/2015 | Sana | A61B 5/05 | 600/527 |
| 2016/0054432 A1* | 2/2016 | Lilburn | G01S 13/28 | 342/195 |
| 2016/0182075 A1* | 6/2016 | Devarajan | H03M 1/128 | 341/120 |
| 2016/0211858 A1* | 7/2016 | Kinyua | H03M 1/468 | |
| 2017/0070237 A1* | 3/2017 | Ardalan | H03M 3/42 | |
| 2017/0248696 A1* | 8/2017 | Vyssotski | G01S 5/0263 | |
| 2018/0076780 A1* | 3/2018 | Wang | H03F 1/02 | |
| 2018/0091630 A1* | 3/2018 | Yeung | H04L 43/024 | |
| 2018/0183455 A1* | 6/2018 | Lee | H03M 1/0863 | |
| 2018/0183457 A1* | 6/2018 | Lee | H03M 1/0678 | |
| 2019/0053786 A1* | 2/2019 | Qiu | A61B 8/56 | |
| 2019/0103876 A1* | 4/2019 | Bhandari | H03M 1/1245 | |
| 2019/0125271 A1* | 5/2019 | Garudadri | A61B 5/0006 | |
| 2019/0154439 A1* | 5/2019 | Binder | G01B 11/26 | |
| 2019/0339386 A1* | 11/2019 | Ding | G01S 15/582 | |

\* cited by examiner

METHODS AND ELECTRONIC DEVICE FOR DYNAMIC DISTANCE MEASUREMENTS

FIELD OF THE DISCLOSURE

Disclosed embodiments relate generally to the field of distance measurements. More particularly, and not by way of any limitation, the present disclosure is directed to methods and an electronic device for dynamic distance measurements.

BACKGROUND

Providing dynamic measurements of distances that can have a large relative range can be accomplished using an Analog to Digital Converter (ADC), and an ultrasonic transducer to measure Time of Flight (TOF) of a signal. In this situation, ADC-based TOF can provide high resolution, but can require a very long sampling period to cover a relatively large TOF range. The long sampling period incurs high power consumption and requires large amounts of memory. In many situations, such a large capture window can increase system cost and/or limit the distance range, while being unable to provide the needed temporal resolution due to limitations on power and memory. Improvements are needed.

SUMMARY

Disclosed embodiments provide methodologies that provide a rough knowledge of the anticipated arrival time of a measurement pulses in a signal. Using the anticipated arrival time, the high resolution data sampling period can be triggered just prior to the anticipated arrival time of the measurement pulses, allowing the length of time that the ADC window is open to both be based on the length of the measurement pulses and to remain constant regardless of the distance to measure. Several example methods to accomplish this task are disclosed, as well as an electronic device capable of performing the methods. The disclosed methods can provide one or more of the following advantages: lower power consumption, lower memory requirements, and faster tracking without increasing system cost and power consumption.

In one aspect, an embodiment of an electronic device for providing distance measurements is disclosed. The electronic device includes a first connector for coupling to a transmitter; a second connector for coupling to a receiver to receive a signal; a pulse generator coupled to provide pulses to the first connector; a memory; an analog-to-digital converter (ADC) coupled to the second connector, the ADC being coupled to convert a received signal to a stream of digital data for storage in the memory; a timer; a comparator coupled to compare the signal to a threshold value; a processing unit coupled to each of the pulse generator, the memory, the ADC, the timer and the comparator; and instructions stored in the memory that when performed by the processing unit, performs a method that comprises determining an estimated time of arrival of a series of measurement pulses in the signal and turning on, prior to the estimated time of arrival, the ADC to capture the series of measurement pulses, wherein the ADC operates at a first resolution provided by sampling the signal at a rate equal to or greater than the Nyquist rate and the ADC remains on for a fixed period of time that is sized to capture the series of measurement pulses.

In another aspect, an embodiment of a non-transitory computer readable medium having a sequence of program instructions which, when executed by a processing unit in an electronic device that is coupled to a transceiver and that comprises a pulse generator and an analog-to-digital converter (ADC), perform a method for providing distance measurements is disclosed. The method on the non-transitory computer readable medium includes determining, at an electronic device coupled to a receiver, an estimated time of arrival of a series of measurement pulses in a signal; and turning on, prior to the estimated time of arrival, an analog-to-digital converter (ADC) to capture the series of measurement pulses, wherein the ADC has a first resolution provided by sampling the signal at a rate equal to or greater than the Nyquist rate and the ADC remains on for a fixed time period that is sized to capture the series of measurement pulses.

BRIEF DESCRIPTION OF THE DRAWINGS

Embodiments of the present disclosure are illustrated by way of example, and not by way of limitation, in the figures of the accompanying drawings in which like references indicate similar elements. It should be noted that different references to "an" or "one" embodiment in this disclosure are not necessarily to the same embodiment, and such references may mean at least one. Further, when a particular feature, structure, or characteristic is described in connection with an embodiment, it is submitted that it is within the knowledge of one skilled in the art to effect such feature, structure, or characteristic in connection with other embodiments whether or not explicitly described. As used herein, the term "couple" or "couples" is intended to mean either an indirect or direct electrical connection unless qualified as in "communicably coupled" which may include wireless connections. Thus, if a first device couples to a second device, that connection may be through a direct electrical connection, or through an indirect electrical connection via other devices and connections.

The accompanying drawings are incorporated into and form a part of the specification to illustrate one or more exemplary embodiments of the present disclosure. Various advantages and features of the disclosure will be understood from the following Detailed Description taken in connection with the appended claims and with reference to the attached drawing figures in which:

DETAILED DESCRIPTION OF THE DRAWINGS

Specific embodiments of the invention will now be described in detail with reference to the accompanying figures. In the following detailed description of embodiments of the invention, numerous specific details are set forth in order to provide a more thorough understanding of the invention. However, it will be apparent to one of ordinary skill in the art that the invention may be practiced without these specific details. In other instances, well-known features have not been described in detail to avoid unnecessarily complicating the description.

Figure 10:
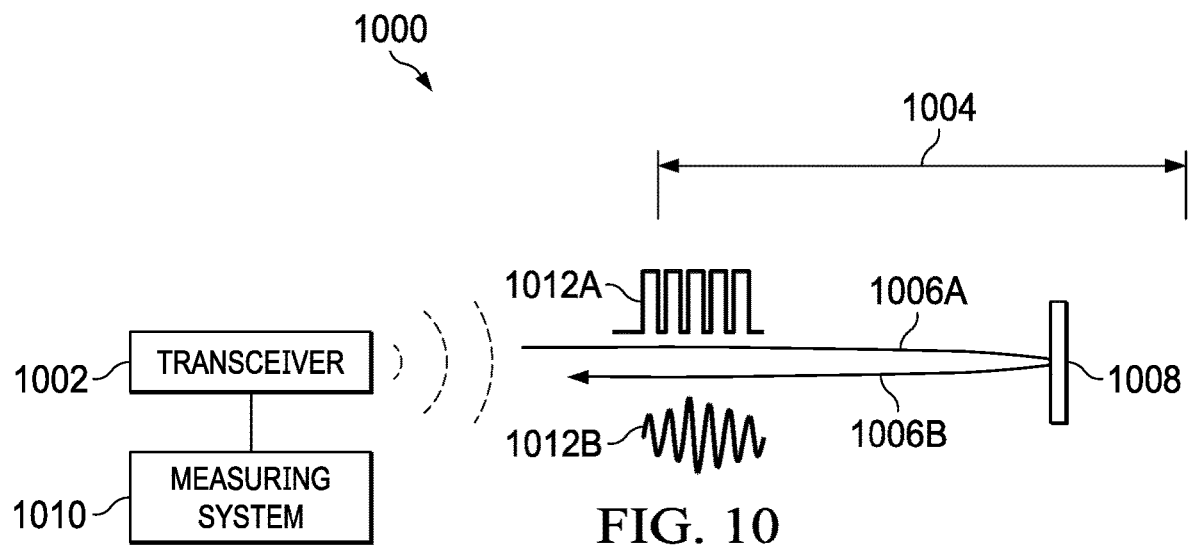
FIG. 10 illustrates the problem to be addressed by the disclosed embodiments.

FIG. 10 depicts a system 1000 for measuring the distance to an object and provides a high level view of some of the problems encountered. A target 1008, whose distance from the measuring system is to be measured, can be located anywhere within a range 1004. In one example embodiment, target 1008 is the top sheet of paper in a drawer that supplies a printer; using an ultrasonic signal, the location of the top sheet can be utilized to track very precisely the number of sheets in the drawer. The sheet of paper can be, for example, 90 microns thick and be placed in a drawer that is 20 cm deep, so that the system requires both an accuracy that can detect when a single sheet is fed and a range that is four orders of magnitude larger.

To determine the location of target 1008, measuring system 1010 causes transceiver 1002 to transmit an outgoing signal 1006A that contains a series of transmitted pulses 1012A. In order to achieve the best resolution, outgoing signal 1006A is sent at an ultrasonic frequency, which may be, for example, 1 MHz. At some point within the range 1004, outgoing signal 1006A strikes target 1008. Some portion of outgoing signal 1006A is reflected back towards transceiver 1002 as reflected signal 1006B and the pulses look similar to the series of reflected pulses 1012B. As long as the level of paper changes slowly, measuring system 1010 can estimate the current location of the target 1008 by searching for series of reflected pulses 1012B in a narrow time frame. If, however, a handful of paper is added to or removed from the tray all at once, measuring system 1010 will generally need to search across the entire range of possible locations to determine where the target 1008 is currently located. How costly this search is depends on the method of measuring distances to the target.

In one method, known as Time-to-Digital Conversion (TDC), a counter is started when the series of pulses 1012A are transmitted. The reflected series of pulses 1012B are detected by measuring system 1010 by comparing reflected signal 1006B to a threshold. When reflected signal 1006B exceeds the threshold, the counter is stopped and the total count is converted to a digital value that is proportional to the distance to the target. In a second, ADC-based method, after sending outgoing signal 1006A, measuring system 1010 stores a digital copy of the reflected signal 1006B for the entire period of time in which series of reflected pulses 1012B might be located. Software is then utilized to examine the stored copy of reflected signal 1006B and locate the beginning of series of reflected pulses 1012B. The ADC-based method is able to determine the distance to target 1008 with greater resolution than TDC measurements, but when the range is large, the costs in terms of memory needed and power consumed in determining the start of the signal are also large.

The electronic device and methods disclosed in this application address the long range by determining a rough time that series of reflected pulses 1012B will arrive at measuring system 1010 and turning on the ADC-based method shortly before the pulses are expected to arrive. The time frame for the signal capture is fixed and extends only long enough to capture the returning pulses.

Figure 1:
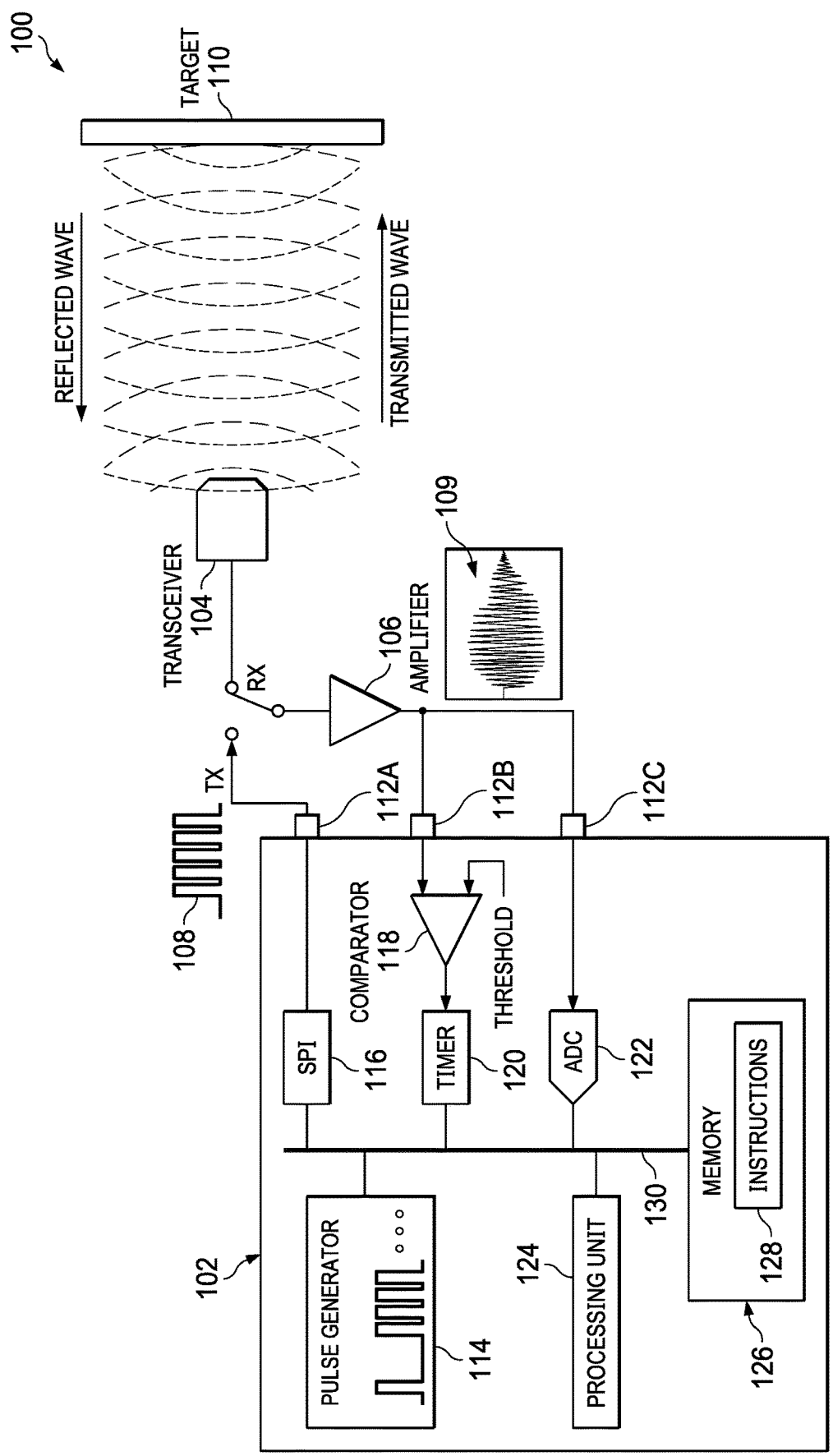
FIG. 1 depicts an example of a system for providing distance measurements according to an embodiment of the disclosure.

FIG. 1 depicts a system 100 for providing distance measurements according to an embodiment of the disclosure. System 100 includes electronic device 102, transceiver 104 and amplifier 106. It will be understood that transceiver 104 can also be replaced by a separate transmitter and receiver. In this embodiment, electronic device 102 is an integrated circuit chip on which a measuring system, such as measuring system 1010 is implemented; connector 112A is designed to be coupled to transceiver 104 and connectors 112B and 112C are designed to be coupled to amplifier 106. Under the control of electronic device 102, transceiver 104 sends a signal that contains transmitted pulses 108 towards target 110. The reflected signal is received at transceiver 104 and directed to amplifier 106. The output of amplifier 106 is then sent to connectors 112B, 112C of electronic device 102, where the signal containing reflected pulses 109 is provided both to comparator 118 and to ADC 122. Electronic device 102 also contains a pulse generator 114, a serial peripheral interface (SPI) 116, timer 120, processing unit 124, memory 126 and bus 130, which provides coupling of the various elements of electronic device 102. Instructions 128 are stored in memory 126.

Performance of instructions 128 by processing unit 124 causes pulse generator 114 to be triggered to send pulses 108 through SPI 116, where they are sent to transceiver 104 to be broadcast. When TDC is being utilized to measure the distance to target 110, timer 120 is started when transmitted pulses 108 are sent; then when reflected pulses 109 are detected by comparison to a threshold at comparator 118, timer 120 is stopped and the distance to target 110 is determined. When ADC 122 is being utilized to determine the distance to target 110, the reflected signal is converted to digital information and stored in memory 126, where the digital information can be analyzed by processing unit 124 to determine the start of reflected pulses 109 and therefore the distance to target 110.

Figure 2:
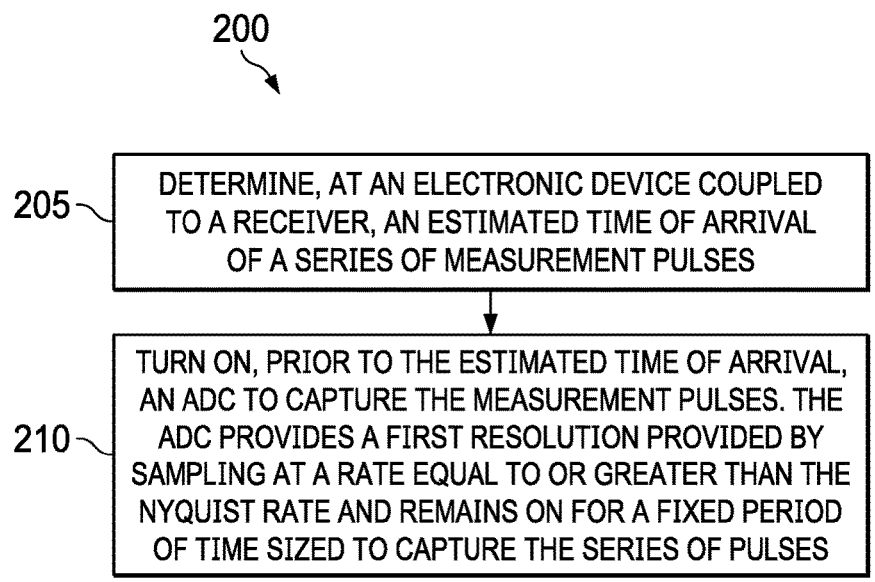
FIG. 2 depicts a flowchart of an overall method for providing distance measurements according to an embodiment of the disclosure.

Instructions 128 are directed to the method 200 shown in FIG. 2, which is a broad expression of the method. Method 200 determines 205, at an electronic device that is coupled to a receiver, an estimated time of arrival of a series of measurement pulses. The method then turns on 210, prior to the estimated time of arrival, an ADC to capture the measurement pulses. The ADC provides a first resolution provided by sampling at a rate equal to or greater than the Nyquist rate and remains on for a fixed period of time that is sized to capture the series of pulses, rather than being sized to capture any signal across the entire range 1004.

Because the estimated time of arrival and the length of reflected pulses 109 are known, the ADC-based capture system can remain on for a fixed period of time that is sufficient to capture reflected pulses 109, but does not consume excessive memory or power. As mentioned, method 200 is a very broad statement of the method. Three possible implementations of method 200 are shown in the following figures, but these methods are merely examples and are not intended to be limitations on the manner in which the broad outlines of the method can be achieved.

In addition to determining the distance to a top sheet of paper in a paper tray and thus the number of sheets remaining in the tray, system 100 combined with method 200 can be utilized for determining distance in many other situations. For example, system 100 can be utilized to measure the distance, within a humidifier, to the surface of the water in a reservoir, demonstrating how full the reservoir is. The level of other liquids, such as gasoline, can also be measured. Mounted a few feet above the ground behind a tractor, system 100 can measure the depth of a furrow being plowed by the tractor. System 100 can also be utilized in collision avoidance systems, such as in an automobile, drone or other vehicle. For the longer distances, such as needed by a drone, ultrasonic wavelengths become impractical due to their attenuation over larger distances. Lower wavelengths can be utilized, e.g., 20-40 KHz, which do not suffer as much attenuation as ultrasonic frequencies, but which cannot provide the same high degree of accuracy as with ultrasonic frequencies.

Figure 3:
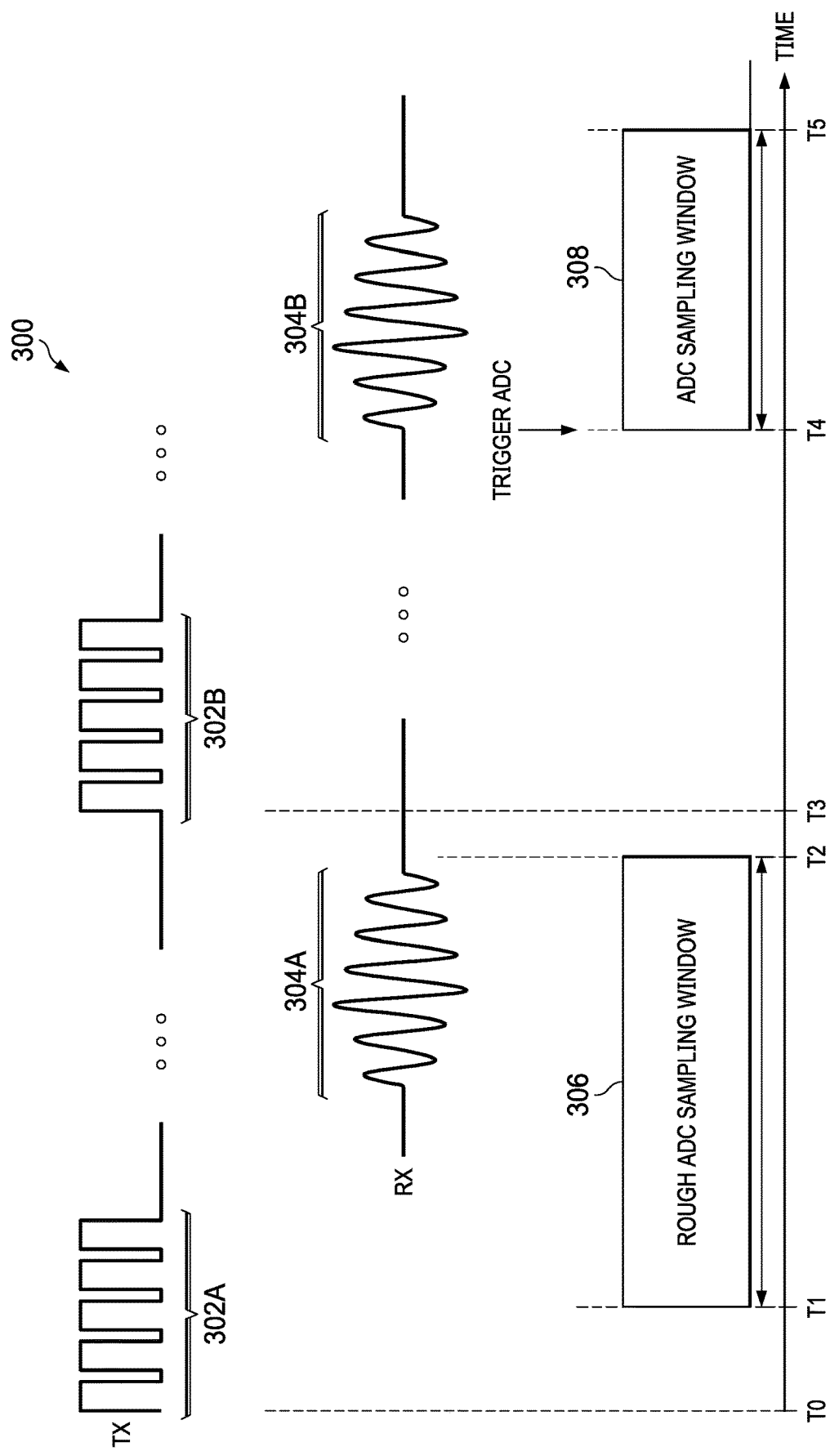
FIG. 3 depicts the signals and capture windows in a method for providing distance measurements according to an embodiment of the disclosure.

FIG. 3 is a diagram 300 that depicts the signals and sampling windows of a first method for providing distance measurements. This first method utilizes two instances of ADC sampling windows; the first sampling window provides a rough measurement of the distance and the second sampling window provides the desired high accuracy. Sampling in an ADC-based detection method generally occurs at a rate equal to or greater than the Nyquist rate. References to ADC sampling in the present disclosure refer to sampling at a rate equal to or greater than the Nyquist rate unless qualified as rough ADC sampling, which can occur at rates much less than the Nyquist rate. The sampling rate for the rough ADC sampling is generally determined as the frequency of transmitted pulses 108 divided by a non-integer divider that is, e.g., between 1.5 and 3.5. A sampling rate determined in this manner can ensure that the peaks of the excitation signal are captured. In one embodiment utilizing a 500 kHz signal, normal ADC sampling is performed at twice the Nyquist rate, e.g. 2 MHz and rough ADC sampling is performed at 200 kHz, or one fifth the Nyquist rate.

In diagram 300, a series of pulses 302A are transmitted beginning at time T0 by transceiver 104. Although five pulses are shown in this and the following examples, typically a series of 15-30 pulses are sent. Starting at a time T1, which represents the earliest time that reflected pulses 304A could possibly return, rough ADC sampling window 306 is opened by performing sampling at considerably less than the Nyquist rate and feeding the samples to ADC 122 for conversion and storage. While this sampling rate may miss the start of the pulses being measured, the pulses can be detected in successive samples and a rough TOF for the pulses can be determined. Because of the low sampling rate, the rough ADC sampling window 306 can remain on for the entire period in which reflected pulses 304A may possibly appear. In an alternate embodiment, once the reflected pulses 304A has been recognized, rough ADC sampling window 306 can be closed at time T2.

At time T3, a second series of pulses 302B is transmitted from transceiver 104. Since the time of transmission of transmitted pulses 302B is known and the rough TOF of transmitted pulses 302A is known, the TOF of transmitted pulses 302B can be estimated from these two values and adjusted for possible errors in the detection of reflected pulses 304A. ADC 122 can then be triggered at time T4 to open ADC sampling window 308. For this second measurement, reflected pulses 304B are sampled at the Nyquist rate or higher in order to provide a determination of the TOF of transmitted pulses 302B that is of the desired resolution. ADC sampling window 308 will be turned on for a fixed length of time that has been determined to be sufficient to contain reflected pulses 304B, then terminated at time T5.

Figure 4:
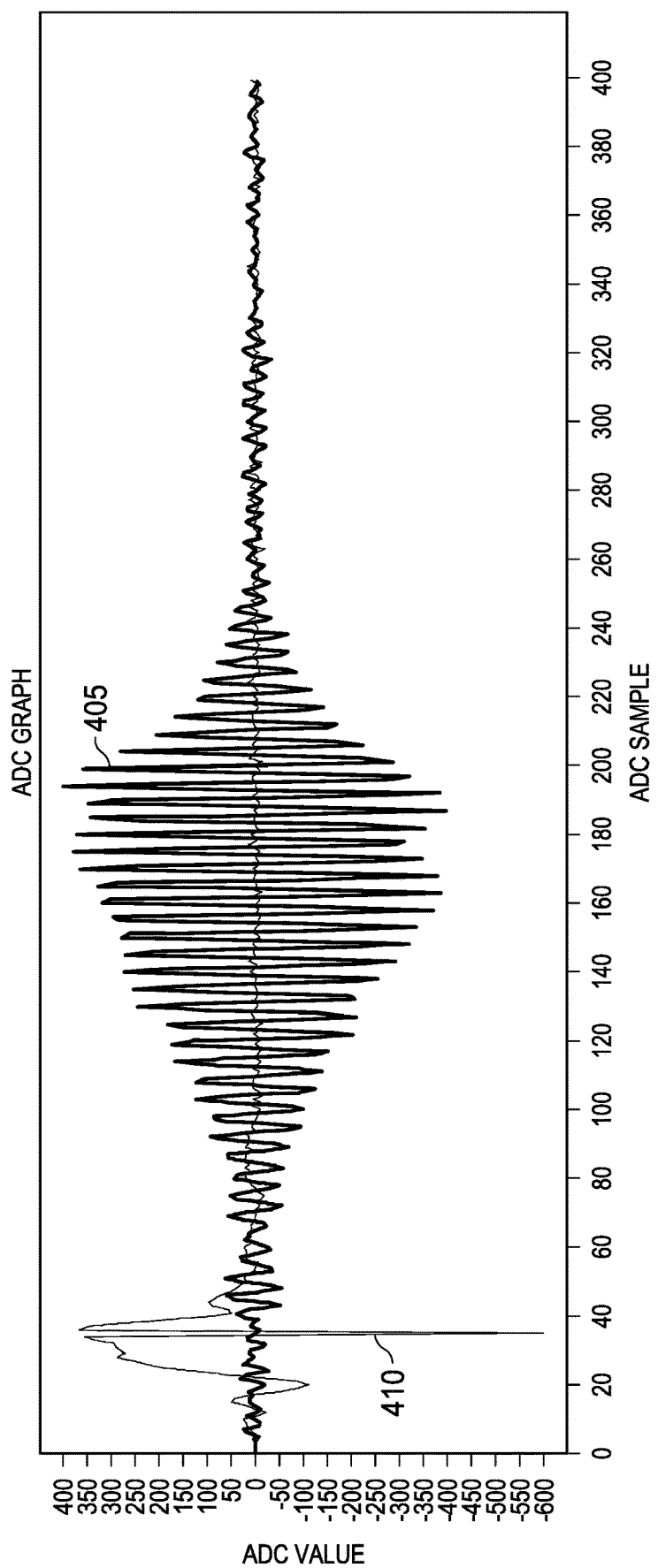
FIG. 4 depicts a graph of waveforms received at the ADC according to an embodiment of the disclosure.

FIG. 4 depicts two waveforms, which are representative of reflected pulses 304A and 304B. Waveform 410 depicts the rough sampled waveform of reflected pulses 304A as received at transceiver 104. In the embodiment in which these waveforms were recorded, a small number of transmitted pulses 302A were sent for the rough estimation, instead of the usual 15-30 pulses. Waveform 405 depicts the waveform of reflected pulses 304B, which are captured over a much smaller period of time, but at the higher sampling rate of ADC sampling window 308. Once waveform 405 has been captured by the ADC, a cross-correlation between waveform 405 and a waveform for transmitted pulses 302B is performed according to known techniques in order to determine the TOF to the desired accuracy.

Figure 5:
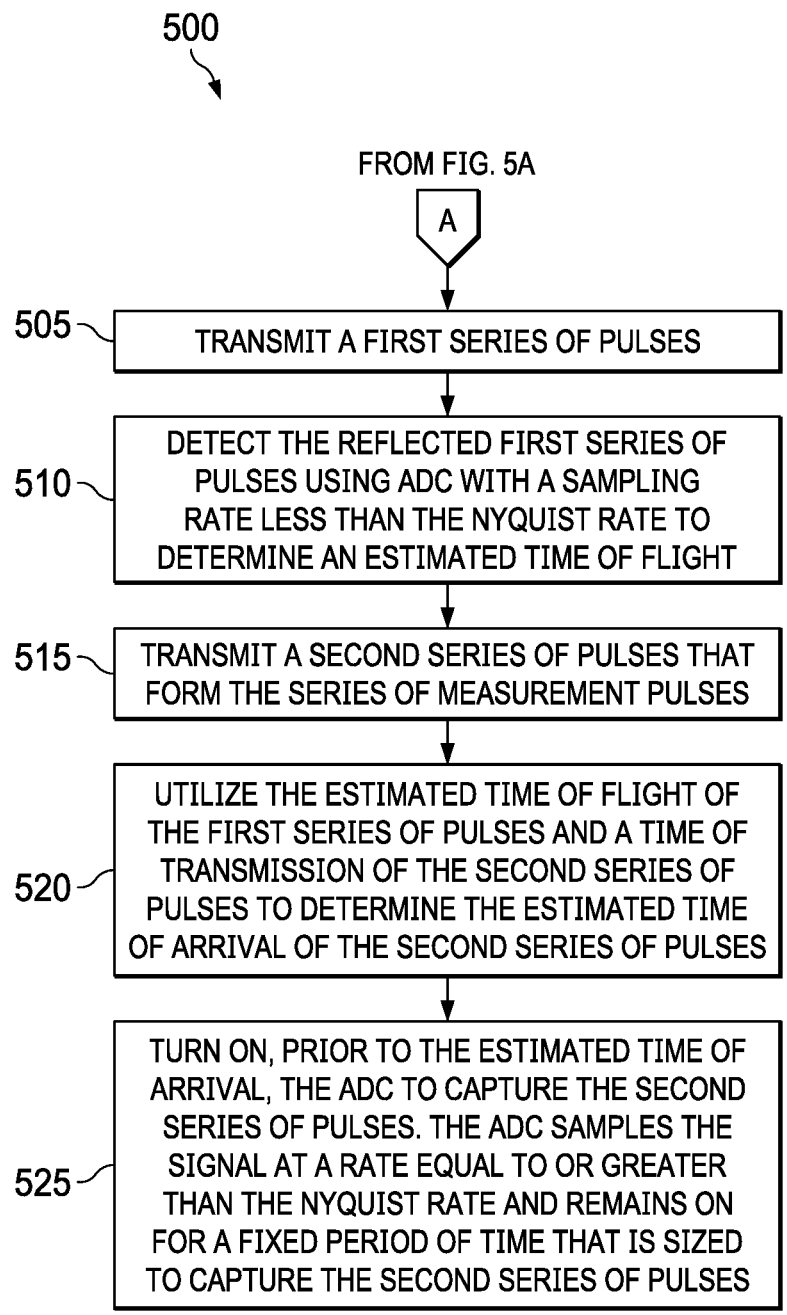
FIG. 5 depicts a flowchart of a method for providing distance measurements according to the embodiment of FIG. 3.

FIG. 5 depicts a flowchart of method 500. Method 500 begins with transmitting 505 a first series of pulses. Some portion of the signal containing the first series of pulses will be reflected back to the transceiver. The reflected first series of pulses is detected 510 using an ADC with a sampling rate that is less than the Nyquist rate to determine an estimated time of flight. In one embodiment, for an ultrasonic signal that is sent at 1 MHz, the rough sampling rate is about 400 KHz. This sampling rate is not very accurate, but can determine roughly when the signal starts. A second series of pulses is then transmitted 515 and forms the series of measurement pulses mentioned in the overall method. Method 500 utilizes 520 the estimated time of flight of the first series of pulses and a time of transmission of the second series of pulses to determine the estimated time of arrival of the second series of pulses. Finally, ADC 122 is turned on 525 to capture the second series of pulses prior to the estimated time of arrival. For this measurement, the ADC samples the signal at a rate equal to or greater than the Nyquist rate and remains on for a fixed period of time. This second measurement can be both highly accurate and limited in time since the approximate time of arrival of the second set of pulses is known.

Figure 5A:
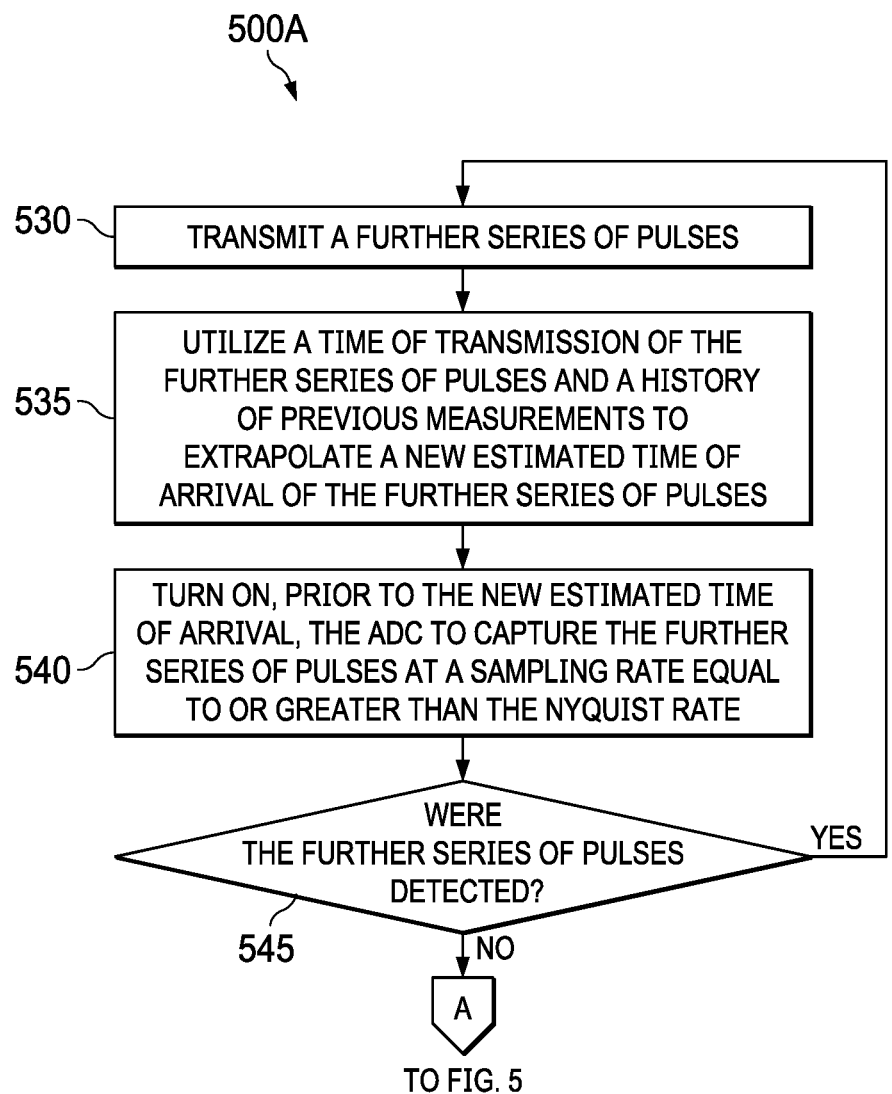
FIG. 5A depicts a flowchart of a method that can be utilized for providing subsequent distance measurements according to the embodiment of FIG. 5.

FIG. 5A depicts a flowchart of a method 500A that can be utilized for subsequent measurements using this first method. This can occur, e.g., when the method is utilized to track paper level in a printer and documents are currently being printed. Method 500A starts with transmitting 530 a further series of pulses. The method extrapolates 535 where the waveform will be found at a given point in time and therefore a new estimated time of arrival for the further series of pulses by utilizing the time of transmission of the further series of pulses along with the history of previous measurements. The method turns on 540, prior to the new estimated time of arrival, the ADC to capture the further series of pulses at a sampling rate equal to or greater than the Nyquist rate. This process assumes that the target is moving with respect to the transceiver with some linearity. Method 500A then determines 545 whether the further series of pulses were detected in the sampling window. If the reflected series of pulses was not found in the anticipated window, the method goes to element 505, reverting to method 500. If, however, the further series of pulses were detected, method 500A can be performed repetitively to provide an ongoing determination of the location of the target. If the movement of the target is anticipated to be cyclical, a model can be created (not specifically shown) to alternate between methods 500 and 500A according to the frequency of the cycle.

Figure 6:
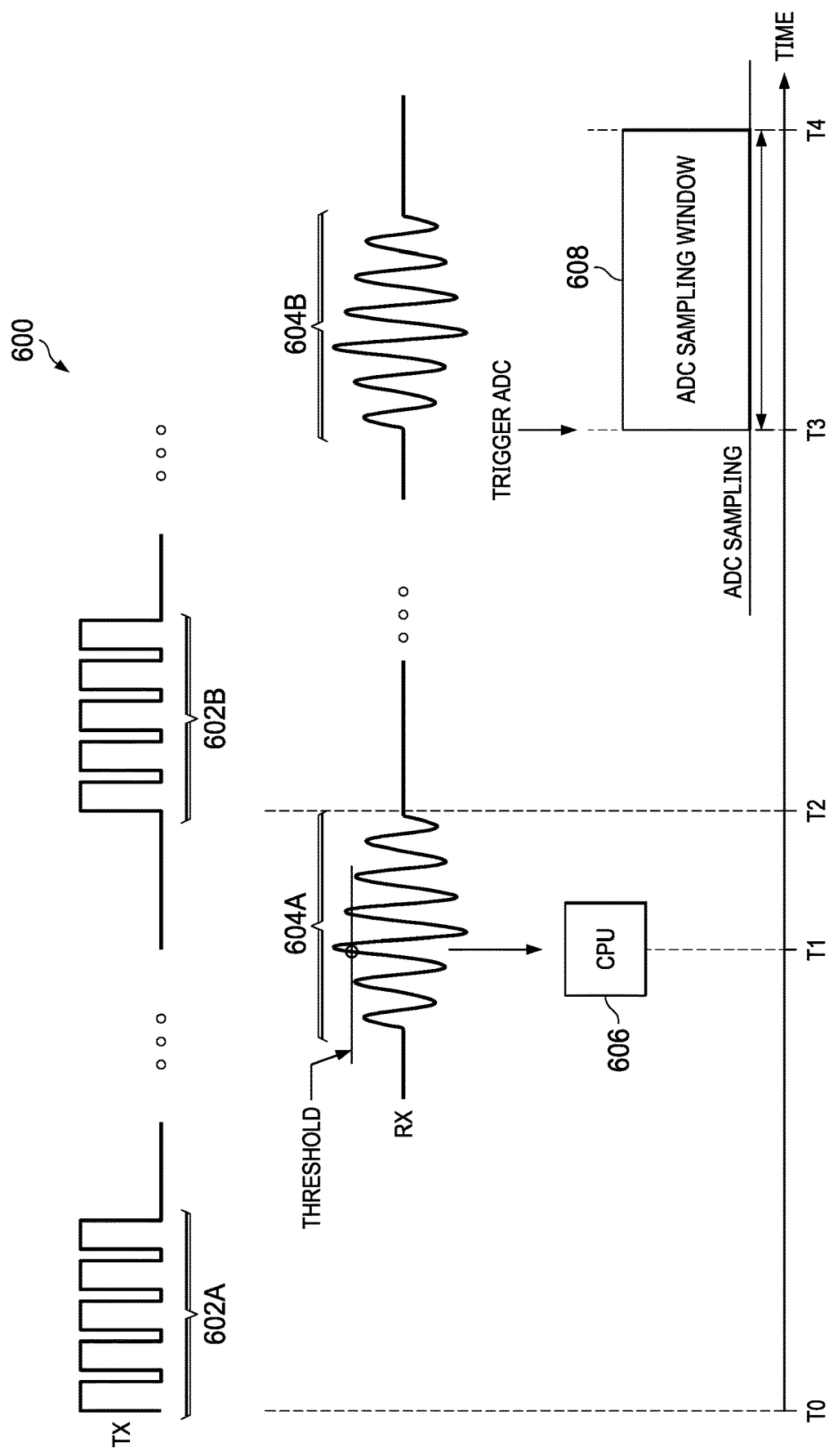
FIG. 6 depicts the signals and capture window in a method for providing distance measurements according to an embodiment of the disclosure.

FIG. 6 is a diagram 600 that depicts the signals and sampling windows of a second method for providing distance measurements. This second method sends two separate series of pulses, as in the first example, but utilizes a combination of TDC and ADC distance determinations in order to save power and storage space. At a time T0, a first series of pulses 602A are transmitted by transducer 104. As noted previously, each series of pulses typically includes 15-30 pulses in order to obtain desired information, but this range is provided as an example only and is not a limitation. At the time pulses 602A are transmitted, timer 120 is started. Comparator 118 receives the reflected signal from transducer 104 and compares the reflected signal against a threshold value in order to roughly detect the arrival of the series of reflected pulses 604A. At time T1, reflected pulses 604A cross the threshold and comparator 118 sends a signal to timer 120 to stop timing. The elapsed time on timer 120 is sent to CPU 606, where the elapsed time is utilized to provide an estimated TOF of a signal reflected from target 110.

Shortly thereafter, a second series of pulses 602B are sent by transceiver 104 at time T2. The time T2 can be added to the TOF for transmitted pulses 602A to determine an expected time of arrival of the series of reflected pulses 604B. This expected time is not entirely accurate, but provides enough accuracy that the sampling window necessary to detect the reflected pulses 604B is much smaller than the entire range. That, is, the ADC can be triggered to open ADC sampling window 608 at a time T3, which is slightly less than time T2 plus the estimated TOF as corrected to account for inaccuracies in the initial measurements. It will be understood that this expected time of arrival of reflected pulses 604B can be adjusted as necessary to ensure that the ADC-based method is operating when reflected pulses 604B arrive. Since the time of arrival of reflected pulses 604B is generally known, ADC 122 is turned on at time T3, opening ADC sampling window 608 to capture reflected pulses 604B and can be turned off at T4, a fixed time later, saving both memory space and power. As in the first method, a cross-correlation between the transmitted pulses 602B and received pulses 604B can then be utilized to determine the TOF with the desired accuracy.

Figure 7:
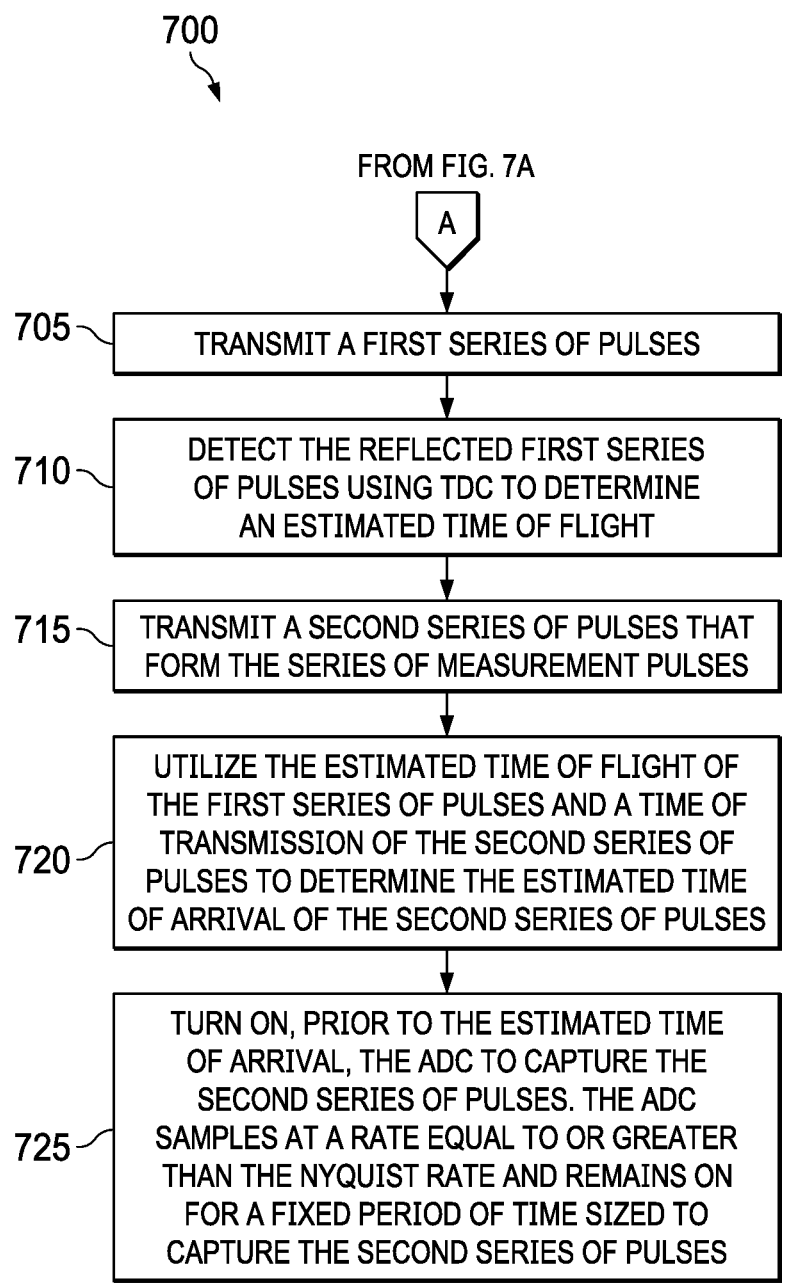
FIG. 7 depicts a flowchart of a method for providing distance measurements according to the embodiment of FIG. 6.

FIG. 7 depicts a flowchart of method 700, which is similar but not identical to method 500. Method 700 starts with transmitting 705 a first plurality of pulses. The reflected first plurality of pulses is detected 710 using TDC to determine an estimated time of flight. Using TDC can include starting a counter when the first plurality of pulses is sent, stopping the counter when the value of a reflected signal containing the reflected first plurality of pulses exceeds a threshold, and utilizing the value of the counter to determine the estimated time of flight. Method 700 continues with transmitting 715 a second plurality of pulses. The method utilizes the estimated time of flight of the first plurality of pulses and the time of transmission of the second plurality of pulses to determine the estimated time of arrival of the second plurality of pulses. As in the previous example, the ADC is turned on 725 prior to the estimated time of arrival of the second plurality of pulses. The ADC samples at a rate that is equal to or greater than the Nyquist rate and remains on for a fixed period of time. Since an approximate time of arrival of the second set of pulses is known, the window of time that the ADC must capture and analyze is a small slice of the much larger window of time that would be necessary to capture across the entire range of times, thus saving power and storage space for the electronic device 102.

Figure 7A:
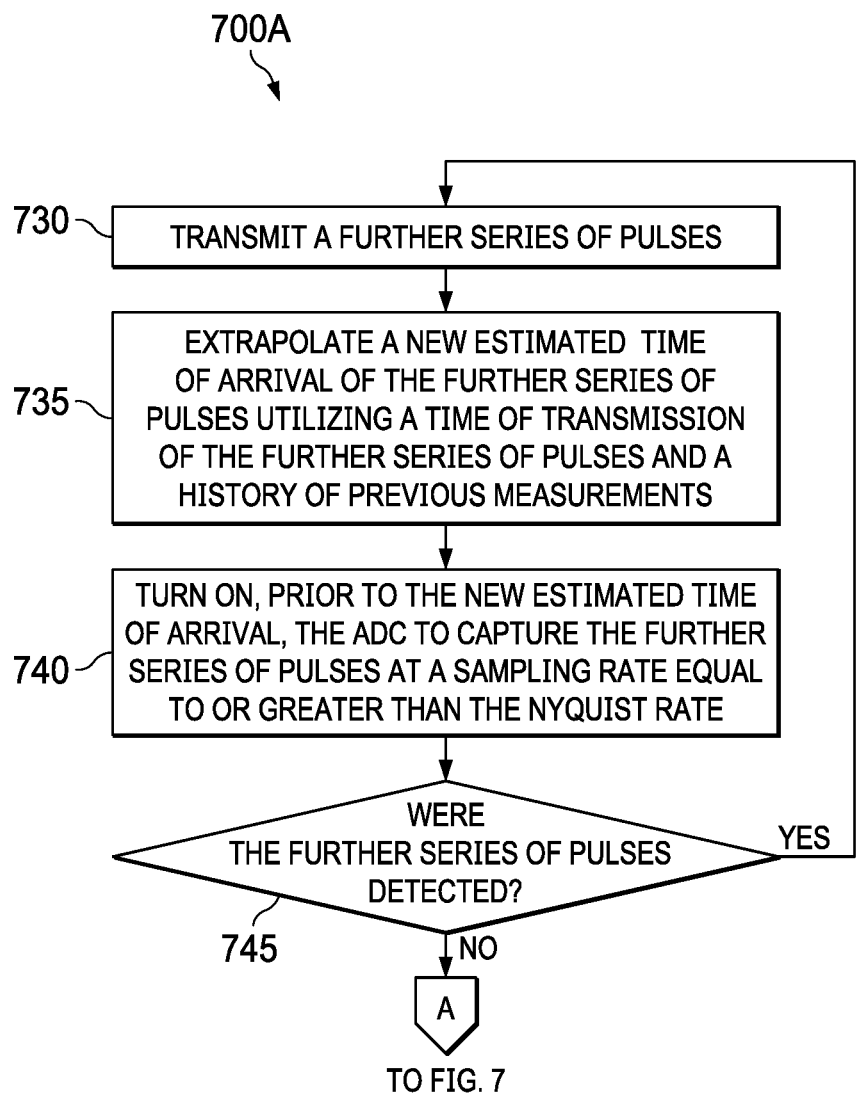
FIG. 7A depicts a flowchart of a method that can be utilized for providing subsequent distance measurements according to the embodiment of FIG. 7.

FIG. 7A depicts a flowchart of a method 700A that can be utilized for subsequent measurements using the second method. Method 700A starts with transmitting 730 a further series of pulses. The method utilizes the time of transmission of the further series of pulses along with the history of previous measurements to extrapolate 735 a new estimated time of arrival for the further series of pulses. The method turns on 740, prior to the new estimated time of arrival, the ADC to capture the further series of pulses at a sampling rate equal to or greater than the Nyquist rate. Again, this process assumes that the target is moving with respect to the transceiver with some linearity. Method 700A then determines 745 whether the further series of pulses were detected in the sampling window. If the reflected series of pulses was not found in the anticipated window, the method goes to element 705, reverting to method 700. If, however, the further series of pulses were detected, method 700A can be performed repetitively to provide an ongoing determination of the location of the target.

Figure 8:
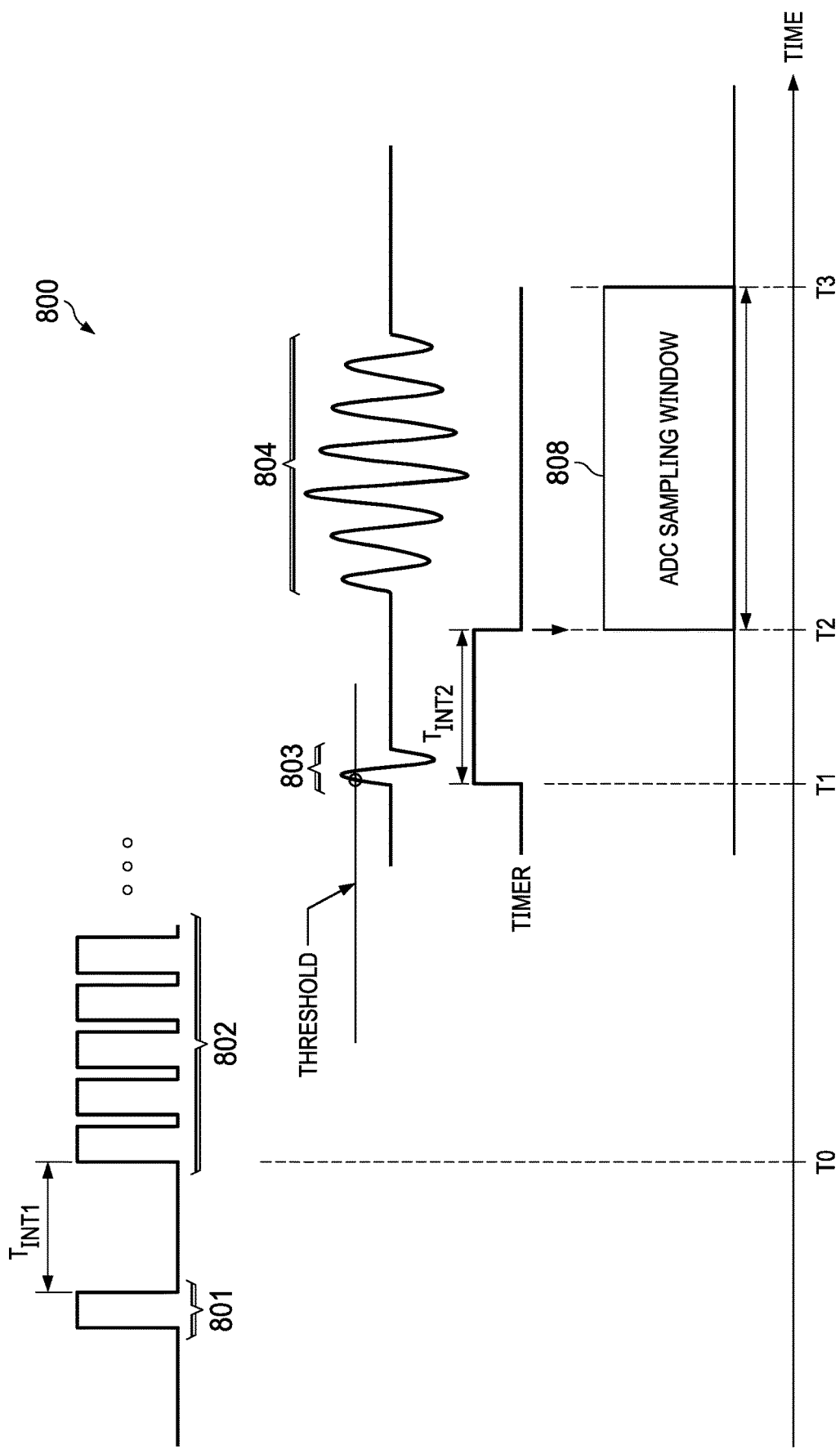
FIG. 8 depicts the signals and capture window in a method for providing distance measurements according to an embodiment of the disclosure.

FIG. 8 is a diagram 800 that depicts the signals and sampling windows of a third method for providing distance measurements. Unlike the other two methods described herein, this third method does not require a rough measurement of the TOF in order to determine when to start the high resolution ADC sampling window. The concept of this third method is to provide a trigger that indicates that the series of measurement pulses will follow after a first interval of time and responsive to detecting the trigger, to turn on the ADC after a second interval of time that is slightly less than the first interval of time. In one embodiment, a preliminary pulse 801 is transmitted, followed after a first interval $T_{INT1}$, by a series of pulses 802 starting at time T0. The preliminary pulse 801 can be a single pulse or a small number of pulses, e.g., two pulses, while the series of pulses 802 typically follow the previous pattern of 15-30 pulses. Interval $T_{INT1}$ is set to allow any ringing from preliminary pulse 801 to die down prior to the transmission of the series of pulses 802. In one embodiment utilizing a 1 MHz transmission signal, the preliminary pulse 801 is 1 microsecond long and interval $T_{INT1}$ is 5-10 microseconds long, followed by the series of pulses 802.

Once the preliminary pulse 801 is transmitted, comparator 118 starts comparing the signal from amplifier 106 to a threshold value. The value of reflected preliminary pulse 803 crosses this threshold at a time T1. When the crossing of the threshold is detected, timer 120 is turned on. It is known that the reflected series of pulses 804 will follow reflected preliminary pulse 803 by a time interval that is equal to $T_{INT1}$. Therefore, timer 120 times for a second interval $T_{INT2}$ that is slightly less than $T_{INT1}$. $T_{INT2}$ can be adjusted as necessary to ensure that the reflected series of pulses 804 will be captured in the ADC capture window. When second interval $T_{INT2}$ ends, processing unit 124 turns on ADC 122 to provide ADC sampling window 808, which is able to capture the entire reflected series of pulses 804 and determine the TOF of the series of pulses 802 very accurately. As in the previous examples, ADC 122 is able to be turned on for a fixed period of time and will sample the reflected signal at the Nyquist rate or higher.

Figure 9:
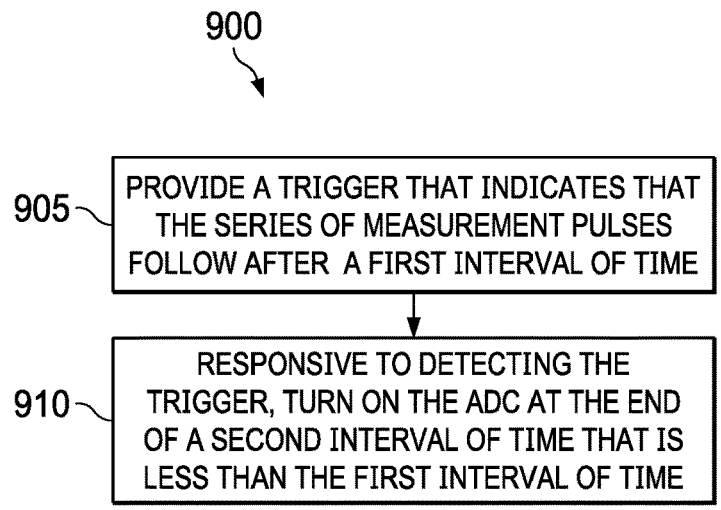
FIG. 9 depicts a flowchart of a method for providing distance measurements according to the embodiment of FIG. 8.

FIG. 9 depicts a generalized flowchart of the method 900 that was illustrated in FIG. 8. Method 900 provides 905 a trigger that indicates that the series of measurement pulses follow after a first interval of time $T_{INT1}$. Responsive to detecting the trigger, the method turns on 910 the ADC prior to the end of a second interval of time $T_{INT2}$ that is slightly less than the first interval of time.

Figure 9A:
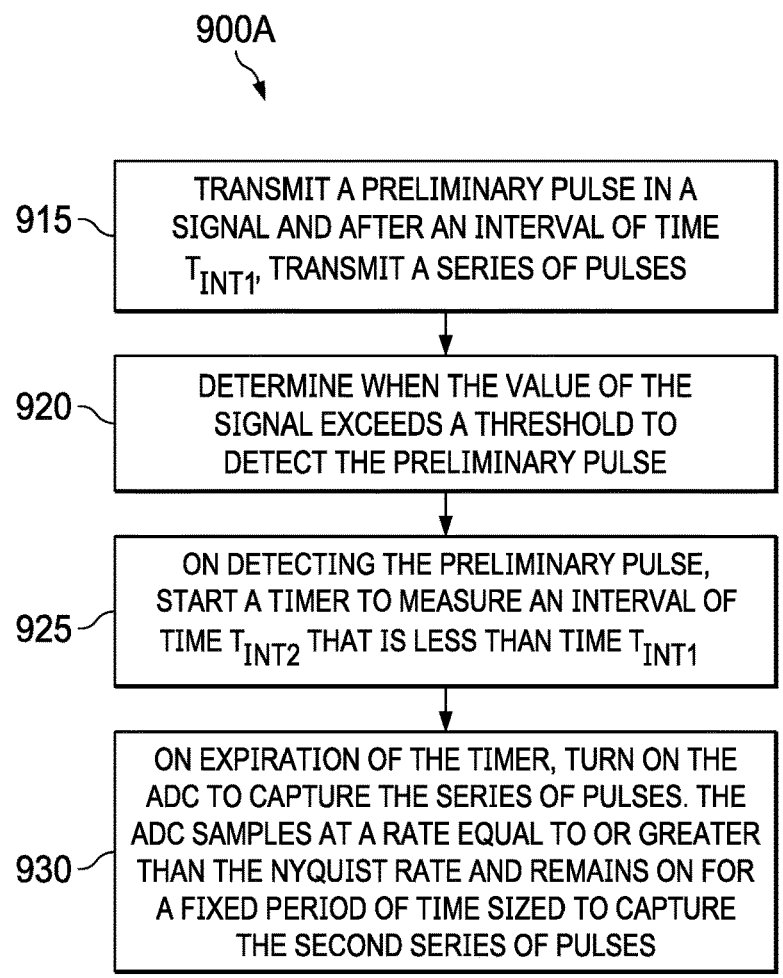
FIG. 9A depicts a more detailed flowchart of the method shown in FIG. 9.

FIG. 9A depicts a more detailed flowchart of the method shown in FIG. 9. Method 900A transmits 915 a preliminary pulse and after an interval of time $T_{INT1}$, transmits a series of pulses in a signal. The method then determines 920 when the value of the signal exceeds a threshold which provides detection of the preliminary pulse. On detecting the preliminary pulse, timer 120 is started 925 for the interval of time $T_{INT2}$, which is slightly less than time $T_{INT1}$. On expiration of the timer, the ADC 122 is turned on 930 to capture the series of pulses. Since this is a high resolution capture, the ADC samples at a rate that is equal to or greater than the Nyquist rate, but is able to remain on for a fixed period of time that is sized to capture the second series of pulses. If the location of the target is moving, method 900 can be performed iteratively without any changes, as the time of arrival of the series of pulse will always be heralded by the preliminary pulse.

At least some example embodiments are described herein with reference to block diagrams and/or flowchart illustrations of computer-implemented methods, and/or computer program products. These computer-implemented methods can be stored as computer program instructions in a non-transitory tangible computer-readable medium that can direct a computer or other programmable data processing apparatus to function in a particular manner, such that the instructions stored in the computer-readable medium produce an article of manufacture including instructions which implement the functions/acts specified in the block diagrams and/or flowchart block or blocks.

In at least some additional or alternative implementations, the functions/acts described in the blocks may occur out of the order shown in the flowcharts. For example, two blocks shown in succession may be executed substantially concurrently or the blocks may sometimes be executed in the reverse order, depending upon the functionality/acts involved. Moreover, the functionality of a given block of the flowcharts and/or block diagrams may be separated into multiple blocks and/or the functionality of two or more blocks of the flowcharts and/or block diagrams may be at least partially integrated. Finally, other blocks may be added/inserted between the blocks that are illustrated.

Although various embodiments have been shown and described in detail, the claims are not limited to any particular embodiment or example. None of the above Detailed Description should be read as implying that any particular component, element, step, act, or function is essential such that it must be included in the scope of the claims. Reference to an element in the singular is not intended to mean "one and only one" unless explicitly so stated, but rather "one or more." All structural and functional equivalents to the elements of the above-described embodiments that are known to those of ordinary skill in the art are expressly incorporated herein by reference and are intended to be encompassed by the present claims. Accordingly, those skilled in the art will recognize that the exemplary embodiments described herein can be practiced with various modifications and alterations within the spirit and scope of the claims appended below.

What is claimed is:

1. An electronic device for providing distance measurements, the electronic device comprising:
a first connector for coupling to a transmitter;
a pulse generator coupled to provide pulses to the first connector;
a second connector for coupling to a receiver to receive a reflected signal associated with the pulses;
a memory;
an analog-to-digital converter (ADC) coupled to the second connector, the ADC being configured to:
convert a first portion of the reflected signal to a first set of digital data for storage in the memory by sampling the first portion of the reflected signal at a first rate that is smaller than a Nyquist rate of the pulses provided by the pulse generator; and
convert a second portion of the reflected signal to a second set of digital data for storage in the memory by sampling the second portion of the reflected signal at a second rate that is equal to or greater than the Nyquist rate of the pulses provided by the pulse generator;
a processing unit coupled to each of the pulse generator, the memory, and the ADC; and
instructions stored in the memory that when performed by the processing unit, performs a method that comprises:
determining, based on the first set of digital data, an estimated time of arrival of the second portion of the reflected signal;
turning on, prior to the estimated time of arrival, the ADC to convert the second portion of the reflected signal such that the ADC remains on for a fixed period of time that is sized to convert the second portion of the reflected signal;
turning off the ADC after the fixed period of time has passed; and
determining a value indicative of distance based on the second set of digital data.

2. The electronic device of claim 1, wherein determining the estimated time of arrival comprises:
providing a trigger that indicates that a subset of the pulses associated with the second portion of the reflected signal follows after a first interval of time; and
responsive to detecting the trigger, turning on the ADC prior to an end of a second interval of time that is less than the first interval of time.

3. The electronic device of claim 1, wherein the pulses are in an ultrasonic range.

4. The electronic device of claim 1, wherein:
the ADC is configured to convert the first portion of the reflected signal by sampling the first portion of the reflected signal at a first resolution; and
the ADC is configured to convert the second portion of the reflected signal by sampling the second portion of the reflected signal at a second resolution that is greater than the first resolution.

5. The electronic device of claim 1, wherein the method comprises causing the ADC, when converting the first portion of the reflected signal, to continuously sample the reflected signal before and after the first portion of the reflected signal is received.

6. The electronic device of claim 1, wherein the method comprises causing the ADC, when converting the first portion of the reflected signal, to end sampling the reflected signal once the first portion of the reflected signal is received.

7. The electronic device of claim 5, wherein the method comprises causing the ADC, when converting the first portion of the reflected signal, to continue sampling the reflected signal during an entire period where the first portion of the reflected signal may possibly be received.

8. The electronic device of claim 2, wherein providing the trigger comprises transmitting at least one first pulse of the pulses followed, the first interval of time later, by the subset of the pulses.

9. The electronic device of claim 2, further comprising responsive to the second interval of time expiring, turning on the ADC for the fixed period of time.

10. A non-transitory computer readable medium having a sequence of program instructions which, when executed by a processing unit in an electronic device that is coupled to a transceiver and that comprises a pulse generator and an analog-to-digital converter (ADC), perform a method for providing distance measurements, the method comprising:
using the ADC configured to operate at a first rate that is less than a Nyquist rate of a set of pulses generated by the pulse generator, generating a first set of digital samples of a first portion of a reflected signal associated with a first portion of the set of pulses;
determining based on the first set of digital samples an estimated time of arrival of a second portion of the reflected signal associated with a second portion of the set of pulses;
turning on, prior to the estimated time of arrival, the ADC to operate at a second rate that is equal to or greater than the Nyquist rate of the set of pulses to generate a second set of digital samples of the second portion of the reflected signal such that the ADC remains on for a fixed time period that is sized to capture the second portion of the reflected signal;
turning off, the ADC after the fixed time period has passed; and
determining a value indicative of distance using the second set of digital samples.

11. The non-transitory computer readable medium of claim 10, wherein:
the determining of the estimate time of arrival of the second portion of the reflected signal includes:
determining a time of flight of the first portion of the reflected signal; and
determining the estimated time of arrival of the second portion of the reflected signal based on the time of flight of the first portion of the reflected signal.

12. A method comprising:
receiving a first set of reflected pulses;
sampling the first set of reflected pulses using an analog-to-digital converter (ADC) operating at a first rate that is less than a Nyquist rate associated with the first set of reflected pulses to produce a first set of sample data;
determining an estimated time of arrival of a second set of reflected pulses based on the first set of sample data;
at a time based on the estimated time of arrival of the second set of reflected pulses, turning on the ADC to operate at a second rate that is equal to or greater than a Nyquist rate associated with the second set of reflected pulses, and while the ADC is turned on:
receiving the second set of reflected pulses; and
sampling, using the ADC, the second set of reflected pulses to produce a second set of sample data;
turning off, the ADC after a fixed time period has passed; and
determining a distance based on the second set of sample data.

13. The method of claim 12, wherein the determining of the estimated time of arrival of the second set of reflected pulses includes:
comparing the first set of sample data associated with the first set of reflected pulses to a threshold; and
determining a time of flight of the first set of reflected pulses based on a time difference between a transmission that produces the first set of reflected pulses and the first set of sample data exceeding the threshold.

14. The method of claim 12, further comprising turning the ADC off after the sampling of the second set of reflected pulses.

15. The method of claim 12, further comprising:
transmitting a first set of pulses to produce the first set of reflected pulses; and
transmitting a second set of pulses to produce the second set of reflected pulses.

16. The non-transitory computer readable medium of claim 10, wherein the method comprises:
generating the first set of digital samples using the ADC to sample the first portion of the reflected signal at a first resolution; and
generating the second set of digital samples using the ADC to sample the second portion of the reflected signal at a second resolution that is greater than the first resolution.

17. The non-transitory computer readable medium of claim 10, wherein the method comprises generating the first set of digital samples using the ADC by continuously sampling the reflected signal during an entire period where the first portion of the reflected signal may possibly be received.

18. The non-transitory computer readable medium of claim 10, wherein the method comprises generating the first set of digital samples using the ADC by causing the ADC to end sampling the reflected signal once the first portion of the reflected signal is received.

19. The method of claim 12, wherein:
the sampling of the first set of reflected pulses is performed at a first resolution; and
the sampling of the second set of reflected pulses is performed at a second resolution that is greater than the first resolution.

20. The method of claim 12, wherein the sampling of the first set of reflected pulses includes continuously sampling using the ADC during an entire period where the first set of reflected pulses may be received.

* * * * *